United States Patent [19]

Lindsay

[11] Patent Number: 4,979,928
[45] Date of Patent: Dec. 25, 1990

[54] BELT PULLEY

[75] Inventor: John S. Lindsay, Shrewsbury, Mass.

[73] Assignee: The Pratt & Whitney Company, Inc., West Hartford, Conn.

[21] Appl. No.: 407,325

[22] Filed: Sep. 14, 1989

[51] Int. Cl.⁵ .............................................. F16H 55/36
[52] U.S. Cl. ...................................... 474/166; 474/187
[58] Field of Search ............... 474/166, 167, 184, 187, 474/101, 106, 107, 249–251, 901

[56] References Cited

U.S. PATENT DOCUMENTS

| 207,626 | 9/1878 | Sargent | 474/250 X |
| 1,708,269 | 4/1929 | Hamerstadt | 474/187 X |
| 2,287,488 | 6/1942 | Ross | 474/187 |
| 3,965,765 | 6/1976 | Vaillette et al. | 474/166 |

FOREIGN PATENT DOCUMENTS

| 0073240 | 6/1893 | Fed. Rep. of Germany | 474/167 |
| 969468 | 9/1964 | United Kingdom | 474/167 |

Primary Examiner—Thuy M. Bui
Attorney, Agent, or Firm—Raymond J. Eifler; John R. Benefiel

[57] ABSTRACT

A pulley having a special outer contour particularly adapted to establish self aligning of narrow width belts rotating thereon. The outside diameter of the pulley is gradually crowned from each end with a more sharply crowned ridge located at the center intermediate the ends of the pulley to provide a compound crowned contour.

4 Claims, 1 Drawing Sheet

BELT PULLEY

This invention concerns belt pulleys, and more particularly self aligning belt type pulleys.

Belts have a tendencey to wander side to side on a pulley unless perfectly adjusted. Rimmed pulleys are often used to confine the belt on the pulley, but for abrasive belts, rim confinement is impractical since the wandering belt will abrade the rims.

Crowning of the pulley has been used for many years to create a self tracking effect since uneven stretching of an uncentered belt tends to move the belt to the centered condition. Such crowning comprises a tapering of the diameter of the pulley to decrease from its center to the ends, either by a slightly curved shape, or by steps or a slight linear tapering of the surfaces.

However, when crowned pulleys are used with narrow width belts, the conventional crowning produces inadequate centering forces for effective self aligning of the belt on the pulley. If a more accentuated crowning were resorted to, excessive stretching of the belt would cause early belt failure.

SUMMARY OF THE INVENTION

The present invention is comprised of a special compound crowned shaped pulley, comprised of shallowly crowned surfaces extending from each end combined with a shallow central ridge formed about the circumference thereof. The addition of the central ridge augments the self centering effect of the crowned surfaces adjacent the ends sufficiently to establish effective self centering of relatively narrow width belts without imposing excessive stretching of the belt or acting as a stress riser tending to destroy the belt.

A compound crowning geometry is thus utilized to generate enhanced self centering forces just sufficient to be effective for narrow belts, while not so great as to unduly stress the belt.

The invention has the advantage of enabling self centering action for narrow belts while not imposing excessive stretching on the belt.

DETAILED DESCRIPTION

In the following detailed description, certain specific terminology will be employed for the sake of clarity and a particular embodiment described, but it is to be understood that the same is not intended to be limiting and should not be so construed inasmuch as the invention is capable of taking many forms and variations within the scope of the appended claims.

Figure 1:
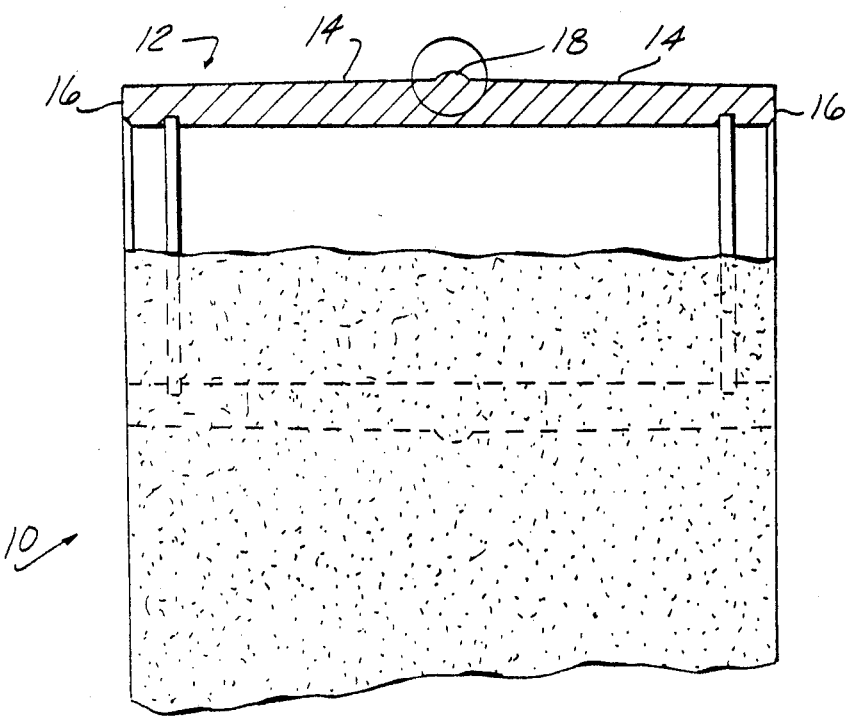
FIG. 1 is a frontal view of a portion of a belt and a drive pulley therefore according to the present invention, shown in partial section.

Referring to FIG. 1, an abrasive belt 10 is shown passing over a generally cylindrical rimless idler pulley 12, mounted by appropriate means (not shown) for rotation about its longitudinal axis.

The outside diameter surfaces 14 adjacent each end 16 of the pulley 12 is slightly crowned, gradually increasing in diameter from each end 16 towards the lateral center. This may be accomplished by a convex curve, stepped diameters, or a 1° taper.

For example, a pulley on the order of 1.5 inches in diameter and 2.75 inches in length is typically is formed with an increase in diameter of approximately 0.060 inches over the extent of the orowning.

At the center of the pulley 12, there is formed a shallow ridge 18 blending on either side into the major crowned surface 14 extending in from each end 16. The central ridge 18 occupies only a small portion of the total width of the surface of the pulley 12.

Figure 2:
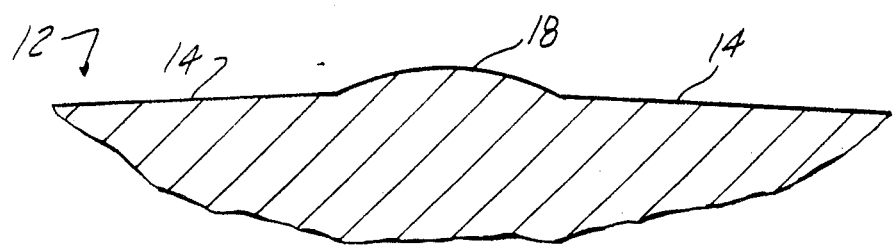
FIG. 2 is an enlarged fragmentary view of the pulley showing the central ridge feature in section.

As seen in FIG. 2, the shallow ridge 18 is comprised of a more sharply crowned region, localized at the lateral center of the pulley 12, and, as noted, being of relatively small width compared to the more gradually crowned surfaces 14 extending in from each end 16.

In a pulley having a diameter on the order of 1.5 inches and a width on the order of 2.75 inches, a ridge height of 0.016 inches and width of 0.16 inches was found effective to establish self centering of the belt 10 and the pulley 12 when combined with the gradual crowning on either end.

This height is substantially less than the height of said lateral surfaces 14, which from the above example, would be 0.030 inches from the end 16 to the base of the central ridge 18. At the same time, the width of the ridge 18 is a very small proportion of the total width of the lateral surfaces 14.

The presence of the ridge 18 creates a compound crowning shape across the width of the pulley 12 in which a gradual, wide crowning surface is combined with a much narrower but more sharply crowned central region.

This compound crowning has been found particularly effective to establish a sufficient self centering effect for narrower width belts without imposing excessive stresses and stretching on the belt.

While a specific example has been described above, the precise dimensions would vary for each particular size of belt and pulley. An experimental procedure may be employed for establishing the minimum height of the ridge to accomplish the required self aligning effect on the belt.

I claim:

1. A belt pulley (12) comprised of a generally cylindrical member (12), said pulley being crowned, gradually increasing in diameter on lateral surfaces (14) extending in from each end (16) thereof, characterized by a central shallow ridge (18) located intermediate said gradually crowned surfaces (14), said ridge (18) being more sharply crowned and increasing in diameter at a greater rate than said lateral surfaces (14) and being limited to a localized region occupying a small proportion of the total width of the pulley crowned lateral surfaces (14).

2. The belt pulley (12) according to claim 1 wherein said central ridge (18) is smoothly curved.

3. The belt pulley (12) according to claim 2 wherein the height of said central ridge (18) is substantially less than the height of said crowning of said lateral surfaces (14).

4. A belt pulley comprised of a rotationally supported rimless generally cylindrical member (12) characterized by a compound crowned outer contour in which a shallowly crowned lateral surfaces (14) extend in from either end (16) of said member (12) gradually increasing in diameter into a central contour (18) localized at the center of said pulley outer contour, said central contour being more sharply crowned, increasing in diameter at a greater rate than said lateral surfaces (14), whereby a self aligning effect on belts rotating over said compound crowning of said surfaces (14) and central contour (18) is achieved.

* * * * *